United States Patent [19]

Miyaoh

[11] Patent Number: 5,201,534
[45] Date of Patent: Apr. 13, 1993

[54] METAL LAMINATE GASKET WITH DOUBLE SEAL RINGS

[75] Inventor: Yoshio Miyaoh, Tokyo, Japan

[73] Assignee: Ishikawa Gasket Co., Ltd., Tokyo, Japan

[21] Appl. No.: 833,432

[22] Filed: Feb. 10, 1992

[30] Foreign Application Priority Data

Feb. 19, 1991 [JP] Japan ................. 3-031724

[51] Int. Cl.$^5$ ............................... F16J 15/08
[52] U.S. Cl. .................. 277/235 B; 277/232; 277/234; 277/236
[58] Field of Search ............. 277/235 B, 180, 231, 277/232, 233, 234, 235 R, 236

[56] References Cited

U.S. PATENT DOCUMENTS

| | | | |
|---|---|---|---|
| 4,369,980 | 1/1983 | Backlin | 277/236 X |
| 4,605,236 | 1/1986 | Tsuchihashi et al. | 277/234 X |
| 4,739,999 | 4/1988 | Ishii et al. | 277/235 B |
| 5,092,613 | 3/1992 | Udagawa | |

FOREIGN PATENT DOCUMENTS

| | | | |
|---|---|---|---|
| 1948681 | 4/1971 | Fed. Rep. of Germany | 277/235 B |
| 3316526 | 11/1984 | Fed. Rep. of Germany | 277/235 B |
| 3601346 | 7/1987 | Fed. Rep. of Germany | 277/235 B |
| 0042945 | 12/1975 | Japan | 277/235 B |
| 0090745 | 5/1984 | Japan | 277/235 B |
| 0229037 | 12/1984 | Japan | 277/235 B |
| 0050258 | 3/1985 | Japan | 277/235 B |
| 0232367 | 10/1986 | Japan | 277/235 B |
| 0125864 | 5/1988 | Japan | 277/236 |
| 0227853 | 9/1989 | Japan | 277/235 B |
| 0134376 | 6/1991 | Japan | 277/235 B |
| 0156156 | 7/1991 | Japan | 277/235 B |

*Primary Examiner*—William A. Cuchlinski, Jr.
*Assistant Examiner*—James K. Folker
*Attorney, Agent, or Firm*—Kanesaka and Takeuchi

[57] ABSTRACT

A metal laminate gasket of the invention is used for an internal combustion engine. The gasket is basically formed of first and second outer plates, at least one middle plate situated between the outer plates, and a sealing member situated adjacent a hole of the engine to surround and define the same. The gasket further includes a first seal ring, and a second seal ring situated outside the first seal ring, both being located outside the sealing member relative to the hole of the engine. A supporting member is integrally formed with one of the outer and middle plates to laminate over the second seal ring. Therefore, when the gasket is tightened, the second seal ring provides surface pressure greater than that on the first seal ring. The surface pressures on the seal rings can be easily changed and regulated by the supporting member.

9 Claims, 2 Drawing Sheets

METAL LAMINATE GASKET WITH DOUBLE SEAL RINGS

BACKGROUND OF THE INVENTION AND RELATED ART STATEMENT

The present invention relates to a metal laminate gasket with two seal rings for securely sealing around a hole.

A metal laminate gasket is formed of a plurality of metal plates, wherein sealing means is formed around a hole to be sealed. When high pressure is created inside a hole, such as a cylinder bore, the area around such hole must be tightened strongly with high surface pressure to secure seal around the hole.

In order to seal around such high pressure hole, a seal ring, such as a wire ring, is installed around the hole. In case the wire ring is used, the wire ring may be strongly tightened to provide high surface pressure therearound. However, in case the wire ring formed near the hole is strongly tightened, an area around the hole may deform by the strong tightening pressure.

In such a case, high tightening pressure is not applied near the hole to be sealed. Instead, high tightening pressure is applied at a portion slightly away from the hole to be sealed.

In a gasket, in order to provide moderate surface pressure near a hole to be sealed and high surface pressure at a portion slightly away from the hole, two wire rings may be coaxially provided around the hole, such as shown in Japanese Utility Model Publication (Examined) No. 50-42945.

In the publication, the sizes or diameters of the wire rings, i.e. inner and outer wire rings, are made different to provide different surface pressures at the wire rings. Namely, the diameter of the inner wire ring is made smaller than that of the outer wire ring. Accordingly, two kinds of wire rings with different diameters must always be used, so that it is difficult to change or adjust surface pressures applied around the hole to be sealed.

The present invention has been made to obviate the above drawbacks of the prior art.

Accordingly, one object of the invention is to provide a metal laminate gasket with seal rings, wherein surface pressures at the seal rings can be easily changed or adjusted without changing the seal rings.

Another object of the invention is to provide a metal laminate gasket as stated above, wherein the seal rings with the same or different sizes may be used to seal around a hole.

A further object of the invention is to provide a metal laminate gasket as stated above, wherein the gasket can be easily and economically manufactured.

Further objects and advantages of the invention will be apparent from the following description of the invention.

SUMMARY OF THE INVENTION

A metal laminate gasket of the invention is used for an internal combustion engine having at least one hole to be sealed. Preferably, the gasket is used as a cylinder head gasket.

The gasket of the invention is basically formed of first and second outer plates extending substantially throughout an entire area of the engine, and at least one middle plate situated between the first and second outer plates. A sealing member is situated adjacent the hole of the engine to surround and define the same.

The gasket of the invention further includes a first seal ring situated outside the sealing member relative to the hole of the engine, a second seal ring situated outside the first seal ring, and a supporting member integrally formed with one of the first and second outer plates and the middle plate. The sizes or diameters of the first and second seal rings are substantially the same.

When the gasket is assembled, the supporting member is laminated over the second seal ring without laminating over the first seal ring. Therefore, when the gasket is tightened, the second seal ring provides surface pressure greater than that formed on the first seal ring. Namely, moderate surface pressure is applied on the first seal ring near the hole to be sealed, while high surface pressure is formed on the second seal ring outside the first seal ring.

In the present invention, although the sizes or diameters of the first and second seal rings or wire rings are the same, the supporting member is laminated over the second seal ring. Therefore, when the gasket is tightened, high surface pressure is formed on the second seal ring.

In case the thickness of the supporting member is changed, the surface pressure formed on the second seal ring can be changed. Therefore, it is easy to regulate and adjust the surface pressure on the gasket.

The sealing member includes a curved portion around the hole of the engine to define the same, and at least one flange. The sealing member may be integrally formed with the first plate, or formed separately, such as a grommet.

In case the sealing member is integrally formed with the first plate, the curved portion extends from the first plate to define the hole of the engine, and the flange further extends outwardly from the curved portion in a direction away from the hole of the engine. Preferably, the supporting member is integrally formed with the second plate, and is located above the flange under the second seal ring.

In case the sealing member is a grommet, the first and second outer plates extend to laminate with flanges of the grommet. One of the first and second outer plates may laminate over the second seal ring. However, both first and second outer plates may extend further to laminate over the second seal ring to thereby form two supporting members.

In case a plurality of middle plates are used, one of the middle plates may extend toward the hole of the engine to laminate over the second seal ring to operate as the supporting member.

DETAILED DESCRIPTION OF PREFERRED EMBODIMENTS

Figure 1:
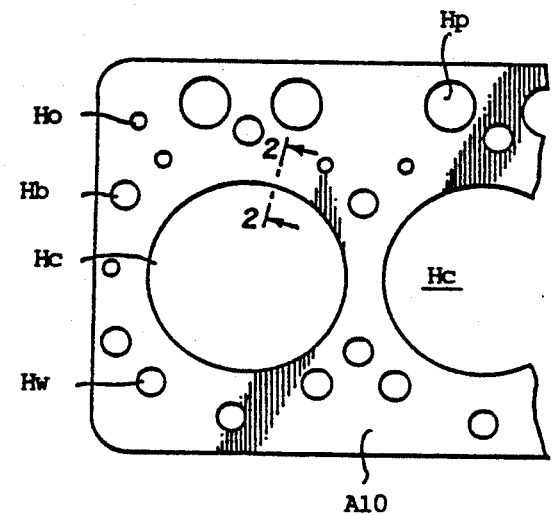
FIG. 1 is a partial plan view of a first embodiment of a metal laminate gasket of the invention.
Figure 2:
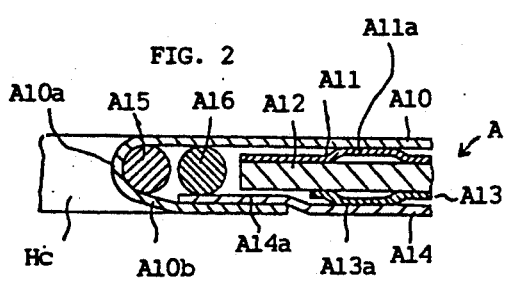
FIG. 2 is an enlarged section view taken along line 2-2 in FIG. 1.
Figure 3:
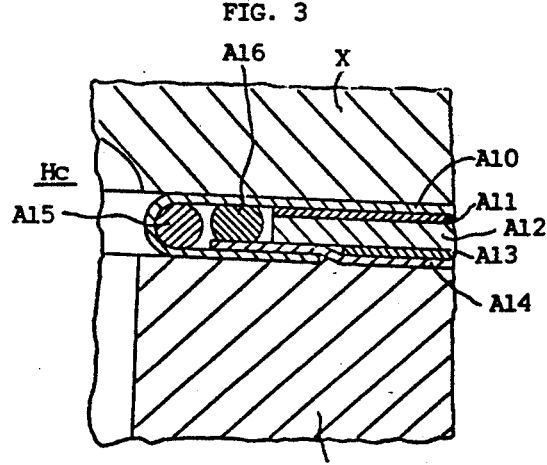
FIG. 3 is an explanatory section view for showing a condition that the gasket as shown in FIGS. 1 and 2 is compressed between a cylinder head and a cylinder block.

Referring to FIGS. 1-3, a first embodiment A of a metal laminate gasket of the invention is shown. The gasket A is a cylinder head gasket and includes a plurality of cylinder bores Hc, water holes Hw, oil holes Ho, push rod holes Hp and bolt holes Hb, as in the conventional gasket.

The areas around the cylinder bores Hc are sealed in accordance with the present invention. Since sealing mechanisms around the water holes Hw, oil holes Ho and so on are not the subject matter of the invention, the sealing mechanisms around the water holes Hw and so on are not explained. Any sealing mechanisms may be used.

As shown in FIG. 2, the gasket A is formed of an upper outer plate A10, three middle plates A11, A12, A13 and a lower outer plate A14. Inner and outer wire rings A15, A16 are situated inside the plates.

The upper outer plate A10 is provided with a curved portion A10a to define the cylinder bore Hc, and a flange A10b extending from the curved portion A10a in the direction away from the cylinder bore Hc.

The middle plate A11 is situated under a base portion of the upper outer plate A10, and includes a hole larger than the cylinder bore Hc and a bead A11a to surround the hole. The middle plate A12 is situated under the middle plate A11, and includes a hole corresponding to the hole of the middle plate A11. The middle plate A13 is situated under the middle plate A12, and includes a hole larger than the flange A10b and a bead A13a to surround the hole. The middle plate A13 does not laminate the flange A10b.

The lower outer plate A14 includes a hole larger than the cylinder bore Hc, and an edge portion A14a around the hole. The edge portion A14a is situated above the flange A10b and under the outer wire ring A16.

The wire rings A15, A16 are made of the same material and have the same diameter or thickness, which is known already in the art. The wire rings A15, A16 are arranged concentrically relative to the cylinder bore Hc. The inner wire ring A15 is situated between the flange A10b and the base portion of the upper outer plate A10, while the outer wire ring A16 is situated between the base portion of the upper outer plate A10 and the edge portion A14a located above the flange A10b.

As shown in FIG. 3, when the gasket A thus prepared is situated between a cylinder head X and a cylinder block Y and is tightened, the gasket A is compressed. Since the outer wire ring A16 is located above the edge portion A14a, the outer wire ring A16 is compressed strongly, though the inner wire ring A15 is not compressed so strongly. Therefore, the outer wire ring A16 provides high surface pressure, while the inner wire ring A15 provides moderate surface pressure.

In case the inner and outer wire rings A15, A16 are made of the same wire rings with the same diameter or thickness, when the gasket A is tightened, it is preferable that the inner wire ring A15 is compressed for 0–0.1 mm, and the outer wire ring A16 is compressed for 0.15–0.40 mm. The thickness of the edge portion A14a or the lower outer plate A14 situated under the outer wire ring A16 is selected to provide the above values to the wire rings A15, A16.

When the gasket A is compressed, the beads A11a, A13a are compressed to further seal around the cylinder bore Hc. Therefore, the gasket A can seal tightly around the cylinder bore Hc.

Figure 5:
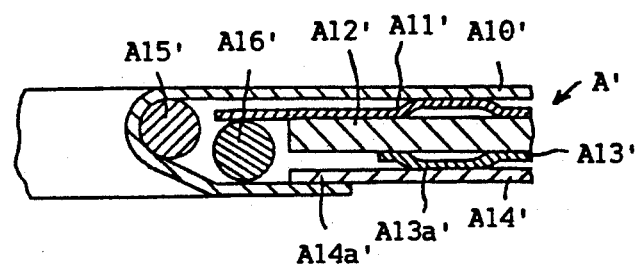
FIG. 5 is a section view, similar to FIG. 2, for showing a modified gasket of the first embodiment.

In the gasket A, the lower outer plate A14 is situated under the outer wire ring A16. However, it is possible to form the lower outer plate A14 not to extend under the outer wire ring A16, and instead, the middle plate A11 extends to laminate over the outer wire ring A16 (FIG. 5). Even if the gasket is modified as stated above, the modified gasket operates as in the gasket A.

Figure 4:
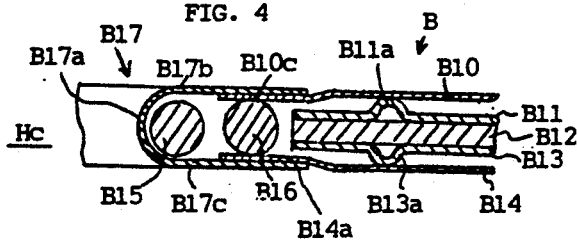
FIG. 4 is a section view, similar to FIG. 2, for showing a second embodiment of the invention.

FIG. 4 shows a second embodiment B of the metal laminate gasket of the invention. The gasket B includes an upper outer plate B10, a middle plate B11 with a bead B11a, a middle plate B12, a middle plate B13 with a bead B13a, a lower outer plate B14, and inner and outer wire rings B15, B16, similar to the gasket A.

In the gasket B, however, a grommet B17 is situated around the cylinder bore Hc. The grommet B17 includes a curved portion B17a to define the cylinder bore Hc, an upper flange B17b located above an edge portion B10c of the upper outer plate B10, and a lower flange B17c located under an edge portion B14a of the lower outer plate B14.

The inner wire ring B15 is situated between the flanges B17b, B17c near the curved portion B17a, while the outer wire ring B16 is situated between the edge portions B10c, B14a located inside the flanges B17b, B17c. When the gasket B is tightened between the cylinder head and the cylinder block, the wire ring B16 is compressed strongly by the edge portions B10c, B14a, while the wire ring B15 is not compressed so strongly.

Therefore, the gasket B can provide moderate surface pressure at a portion near the cylinder bore Hc, and strong surface pressure at a portion away from the cylinder bore Hc. The gasket B operates as in the qasket A.

In the present invention, the inner and outer wire rings are situated around the hole to be sealed. The outer wire ring is additionally laminated over one of the plates for constituting a metal laminate gasket. Therefore, it is possible to easily regulate surface pressure applied onto the wire rings.

While the invention has been explained with reference to the specific embodiments of the invention, the explanation is illustrative and the invention is limited only by the appended claims.

What is claimed is:

1. A metal laminate gasket for an internal combustion engine having at least one hole to be sealed, comprising, first and second outer plates extending substantially throughout an entire area of the engine and having holes corresponding to the hole of the engine, at least one middle plate situated between the first and second outer plates and having a hole larger than the hole of the engine, a sealing member situated adjacent the hole of the engine to surround and define the same, a first seal ring situated outside the sealing member relative to the hole of the engine, a second seal ring situated outside the first seal ring relative to the hole of the engine, said second seal ring having a cross-sectional diameter substantially equal to a cross-sectional diameter of the first seal ring, and a supporting member integrally formed with one of the first outer plates, the second outer plate and the middle plate, said supporting member being disposed over the the second seal ring without being disposed over the first seal ring so that when the gasket is tightened, the second seal ring provides surface pressure greater than that on the first seal ring to securely seal around the hole of the engine away from the same.

2. A metal laminate gasket according to claim 1, wherein said sealing member includes a curved portion round the hole of the engine and at least one flange to seal around the hole of the engine.

3. A metal laminate gasket according to claim 2, wherein said sealing member is a grommet having a curved portion and two flanges.

4. A metal laminate gasket according to claim 3, wherein said flanges are situated over the first and second outer plates to cover the same.

5. A metal laminate gasket according to claim 1, wherein a plurality of the middle plates are situated between the first and second outer plates.

6. A metal laminate gasket for an internal combustion engine having at least one hole to be sealed, comprising,
   first and second outer plates extending substantially throughout an entire area of the engine and having holes corresponding to the hole of the engine,
   at least one middle plate situated between the first and second outer plates and having a hole larger than the hole of the engine,
   a sealing member situated adjacent the hole of the engine to surround and define the same, said sealing member being integrally formed with the first outer plate and including a curved portion extending from the first outer plate around the hole of the engine, and at least one flange extending from the curved portion in a direction away from the hole of the engine to seal around the hole of the engine,
   a first seal ring situated outside the curved portion of the sealing member relative to the hole of the engine,
   a second seal ring situated outside the first seal ring relative to the hole of the engine, said second seal ring having a cross-sectional diameter substantially equal to a cross-sectional diameter of the first seal ring, and
   a supporting member integrally formed with one of the first outer plate, the second outer plate and the middle plate, said supporting member being disposed over the second seal ring without being disposed over the first seal ring so that when the gasket is tightened, the second seal ring provides surface pressure greater than that on the first seal ring to securely seal around the hole of the engine away from the same.

7. A metal laminate gasket according to claim 6, wherein said supporting member is integrally formed with the second plate, said supporting member being located over the flange so that the second seal ring is situated between the first plate and the supporting member.

8. A metal laminate gasket according to claim 7, wherein said middle plate is located between the first and second plates without laminating the first and second seal rings.

9. A metal laminate gasket for an internal combustion engine having at least one hole to be sealed, comprising,
   first and second outer plates extending substantially throughout an entire area of the engine and having holes corresponding to the hole of the engine,
   at least one middle plate situated between the first and second outer plates and having a hole larger than the hole of the engine,
   a sealing member situated adjacent the hole of the engine to surround and define the same, said sealing member being a grommet having a curved portion and two flanges situated over the first and second outer plates to cover the same,
   a first seal ring situated outside the curved portion of the sealing member relative to the hole of the engine,
   a second seal ring situated outside the first seal ring relative to the hole of the engine, said second seal ring having a cross-sectional diameter substantially equal to a cross-sectional diameter of the first seal ring, and
   two supporting members integrally formed with the respective first and second outer plates, said supporting members being disposed over the second seal ring without being disposed over the first seal ring so that when the gasket is tightened, the second seal ring provides surface pressure greater than that on the first seal ring to securely seal around the hole of the engine away from the same.

* * * * *

UNITED STATES PATENT AND TRADEMARK OFFICE
CERTIFICATE OF CORRECTION

PATENT NO. : 5,201,534
DATED : April 13, 1993
INVENTOR(S) : Yoshio Miyaoh

It is certified that error appears in the above-identified patent and that said Letters Patent is hereby corrected as shown below:

Column 4, line 64, change "the first outer plates" to --the first outer plate--;
line 66, change "over the the" to --over the--.
Column 5, line 6, change "round" to --around--.

Signed and Sealed this

Thirtieth Day of November, 1993

Attest:

BRUCE LEHMAN

Attesting Officer

Commissioner of Patents and Trademarks